(12) United States Patent
Kotani et al.

(10) Patent No.: US 9,024,626 B2
(45) Date of Patent: May 5, 2015

(54) ANGLE DETECTING DEVICE

(75) Inventors: Wakana Kotani, Kariya (JP); Toshihito Nagai, Kariya (JP); Hisayoshi Okuya, Nishio (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/881,514

(22) PCT Filed: Oct. 18, 2011

(86) PCT No.: PCT/JP2011/073917
§ 371 (c)(1),
(2), (4) Date: Apr. 25, 2013

(87) PCT Pub. No.: WO2012/060216
PCT Pub. Date: May 10, 2012

(65) Prior Publication Data
US 2013/0221956 A1 Aug. 29, 2013

(30) Foreign Application Priority Data
Nov. 2, 2010 (JP) ................................. 2010-245859

(51) Int. Cl.
*G01B 7/30* (2006.01)
*G01D 5/14* (2006.01)

(52) U.S. Cl.
CPC . *G01B 7/30* (2013.01); *G01D 5/145* (2013.01)

(58) Field of Classification Search
None
See application file for complete search history.

(56) References Cited

U.S. PATENT DOCUMENTS

| 6,341,426 | B1 | 1/2002 | Okumura | |
|---|---|---|---|---|
| 6,359,432 | B1 | 3/2002 | Okumura | |
| 7,408,341 | B2 * | 8/2008 | Okuya et al. | 324/207.25 |
| 7,495,432 | B2 * | 2/2009 | Kato et al. | 324/207.25 |
| 2002/0139179 | A1 | 10/2002 | Okumura | |
| 2004/0194558 | A1 | 10/2004 | Nagase | |

(Continued)

FOREIGN PATENT DOCUMENTS

| DE | 299 01 516 U1 | 4/1999 |
|---|---|---|
| DE | 199 08 522 C2 | 11/2001 |
| DE | 199 00 330 C2 | 6/2002 |

(Continued)

OTHER PUBLICATIONS

Office Action issued on Mar. 13, 2014, by the German Patent Office in corresponding German Patent Application No. 11 2011 103 636.1, and an English Translation of the Office Action. (6 pages).

(Continued)

*Primary Examiner* — Paresh Patel
(74) *Attorney, Agent, or Firm* — Buchanan Ingersoll & Rooney PC

(57) ABSTRACT

The detecting device comprises a rotation member with a magnet portion which generates a magnetic field having different polarities arranged alternately in a circumferential direction, a case having a bearing, an angle calculating device and an elastic member which biases the rotation member so that the rotation member is rotated, keeping a constant inclined angle relative to a central axis line of the bearing or a phase difference between a rotation phase of the rotation member and a rotation phase of the bearing rotating about the central axis line thereof with an inclined angle relative to the rotation member is kept constant regardless of the change of the rotation angle of the rotation member.

12 Claims, 5 Drawing Sheets

(56) References Cited

U.S. PATENT DOCUMENTS

2007/0108967 A1  5/2007  Okuya et al.
2008/0265877 A1  10/2008  Kato et al.

FOREIGN PATENT DOCUMENTS

| DE | 199 41 805 B4 | 12/2004 |
| DE | 60 2004 006 791 T2 | 10/2007 |
| JP | 2001-173482 A | 6/2001 |
| JP | 2005-106577 A | 4/2005 |
| JP | WO 2005/108197 A1 | 11/2005 |
| JP | 2007-040850 A | 2/2007 |
| JP | 2007-139458 A | 6/2007 |
| JP | 2008-292466 A | 12/2008 |
| JP | 2010-078366 A | 4/2010 |

OTHER PUBLICATIONS

International Search Report (PCT/ISA/210) issued on Nov. 22, 2011, by the Japanese Patent Office as the International Searching Authority for International Application No. PCT/JP2011/073917.

* cited by examiner

ANGLE DETECTING DEVICE

TECHNICAL FIELD

This invention relates to an angle detecting device which detects a rotation angle based on the change of magnetic field.

BACKGROUND OF THE TECHNOLOGY

An angle detecting device is used, for example, as a rotation angle sensor which detects an operation angle of a vehicle brake pedal or a shift lever for a transmission of a vehicle. Conventional angle detecting devices are disclosed in Patent Documents 1 and 2. These conventional angle detecting devices detect a rotation angle based on the change of the magnetic field. The angle detecting device of the above conventional type includes a magnet magnetized so that the magnetic performance is exerted alternately in a circumferential direction on a rotation member which is the subject of the angle detection. Further, the conventional angle detecting device detects a first magnetic field component in a radial direction and a second magnetic field component in a direction perpendicular thereto relative to the rotation member and calculates the angle of the rotation member based on the detected first and the second magnetic field components which change in response to the rotation of the rotation member.

DOCUMENT LIST OF STATE OF ART

Patent Document

Patent Document 1: JP2007-40850 A
Patent Document 2: JP2008-292466 A

DISCLOSURE OF INVENTION

Problems to be Solved

It is noted here that the rotation member in the angle detecting device is rotatably supported on the housing via a bearing secured to the housing and normally a dimensional tolerance between the outer diameter of the rotation member and the inner diameter of the bearing is provided considering certain margins of dimensional error possibly occurred during manufacturing. For this purpose, a gap is provided between the rotation member and the bearing upon assembling. Accordingly, the magnetic field components of the magnetic field formed by the rotation member are fluctuated when the rotation member rattles due to a gap provided between the rotation member and the bearing. In order to obviate such drawbacks, one means for reducing the size of the gap can be proposed, which is to improve a dimensional accuracy of the rotation member and the bearing. However, this proposed solution may lead to an increase of manufacturing cost and deterioration of assemblability of the device.

Accordingly, this invention was made considering the above conventional drawbacks and it pertains to an angle detecting device which can detect more accurately a rotation angle than conventional devices.

Means for Solving the Problems (1) The angle detecting device associated with a first aspect of the invention is characterized in that the device comprises a rotation member provided with a magnet portion which generates a magnetic field having polarities arranged alternately in a circumferential direction, a case having a bearing on which the rotation member is rotatably supported, an angle calculating means for detecting magnetic field components of the magnetic field in a plurality of different directions and calculating a rotation angle of the rotation member based on the detected magnetic field components and an elastic member which biases the rotation member so that the rotation member is rotated, keeping a constant inclined direction relative to a central axis line of the bearing or which biases the rotation member so that a phase difference between a rotation phase of the rotation member and a rotation phase of the bearing rotating about the central axis line thereof with the inclined direction relative to the rotation member is kept constant regardless of a change of the rotation angle of the rotation member.

BRIEF EXPLANATION OF ATTACHED DRAWINGS

First Embodiment: FIG. 1A is a cross sectional view in an axial direction showing the angle detecting device;

Figure 8A:
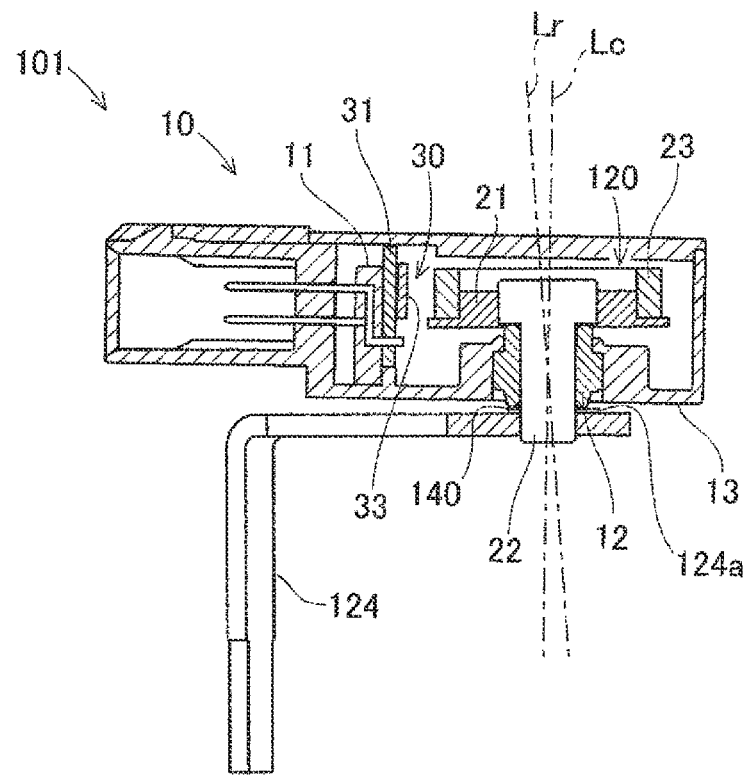
Figure 8B:
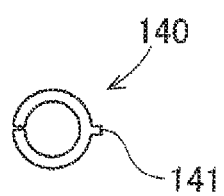

Second Embodiment: FIG. 8A is a cross sectional view of the angle detecting device in an axial direction;

FIG. 8B is an upper view of the spring washer shown in FIG. 8A; and

Figure 8C:
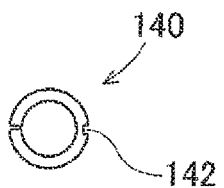

Modified Embodiment of the Second Embodiment: FIG. 8C is an upper view of the spring washer.

THE EMBODIMENTS FOR IMPLEMENTING THE INVENTION

The embodiments of the angle detecting device associated with the present invention will be explained with reference to the attached drawings

First Embodiment (Structure of the Angle Detecting Device 1)

Figure 1A:
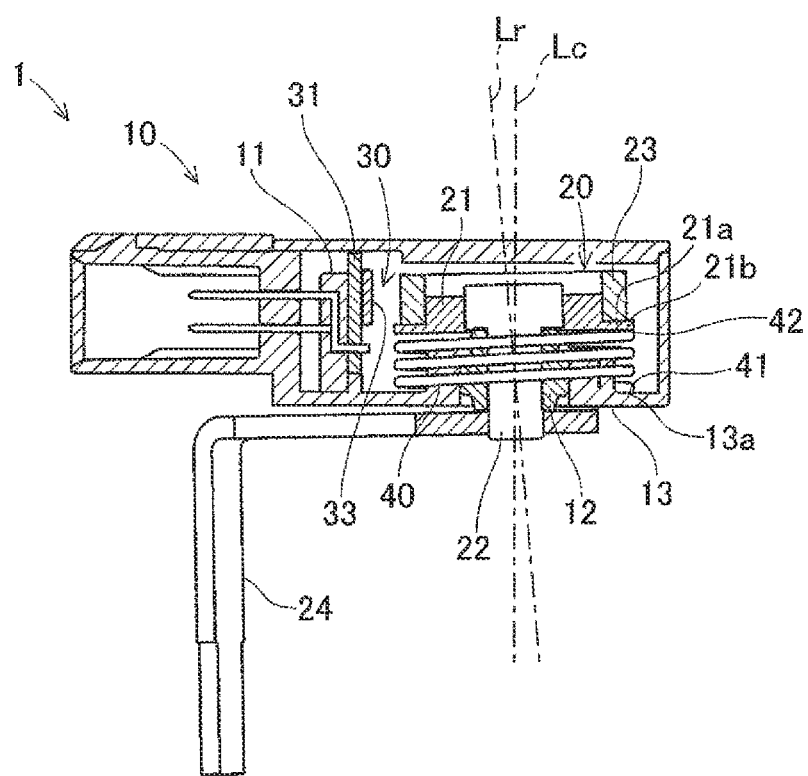
FIG. 1B shows an upper view of the torsion spring shown in FIG. 1A.
Figure 1B:
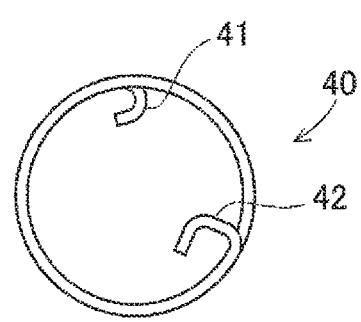

The angle detecting device 1 is applied, for example, as an angle detecting sensor which detects an operation angle of a vehicle brake pedal or a shift lever of a transmission of the vehicle. According to this embodiment, as shown in FIG. 1A, the angle detecting device 1 is formed mainly by a case 10, a rotation member 20, an angle calculating device 30 and a torsion spring 40. The angle detecting device 1 detects the magnetic field components which are variable in response to the rotation of the rotation member 20 by the angle calculating device 30 and calculates the rotation angle of the rotation member 20 relative to the case 10.

The case 10 forms the outer profile of the angle detecting device and is fixed to a vehicle body. The case 10 includes, as shown in FIG. 1A, a base portion 11, a bearing 12 and a side wall portion 13. The base portion 11 is a portion to support a base plate 31 of the angle calculating device 30. The bearing 12 is fixed to the case 10 and rotatably supports the rotation member 20 at an inner peripheral surface of the cylindrical shape. The central axis line Lc of the bearing 12 is the center of the cylindrical inner surface of the bearing 12 and the line Lc extends in a vertical direction (up/down direction as viewed in FIG. 1A). The side wall portion 13 is a portion to connect the base portion 11 and the fixed side of the bearing 12. The side wall portion 13 is provided with a first spring fixing portion 13a concaved in the central axis line Lc direction. This first spring fixing portion 13a is engaged with a first attaching portion 41 of the torsion spring 40 which will be later explained in detail The rotation member 20 is a member which rotates relative to the case 10 and includes an annular main body 21, an axial portion 22, a magnet portion 23 and an operation lever 24. The annular main body 21 is formed with a flange portion 21a at one end of the main body 21 which is a closer side to the bearing 12 of the case 10 (lower side end as viewed in FIG. 1A) and the flange portion 21a projects outwardly in a radial direction from the outer peripheral surface. A second spring fixing portion 21b is formed on the flange portion 21a at a position apart from the rotation axis line Lr in a radial direction and concaved in the rotation axis line direction. This second spring fixing portion 21b is engaged with a second attaching portion 42 of the torsion spring 40 which will be later explained in detail.

The axial portion 22 is a shaft member cylindrically formed and the outer peripheral surface of one end side (upper side as viewed in FIG. 1A) is inserted into the inner peripheral surface of the annular main body 21 for connecting the two members. The axial portion 22 is inserted into the cylindrical inner surface of the bearing 12 of the case 10 and rotatably supported by the bearing 12. The outer diameter of the axial portion 22 is manufactured to have a certain dimensional tolerance considering the margin of errors upon manufacturing. Accordingly, the axial portion 22 is assembled with a certain gap with the bearing 12. The rotation axis line Lr of the rotation member 20 rotatably supported on the bearing 12 at the axial portion 22 can be tilted to a certain degree with respect to the central axis line Lc of the bearing 12. The maximum inclination angle of the rotation axis line relative to the central axis line of the bearing 12 can be determined based on the dimensional difference between the inner diameter of the bearing 12 and the outer diameter of the axial portion 22.

Figure 2:
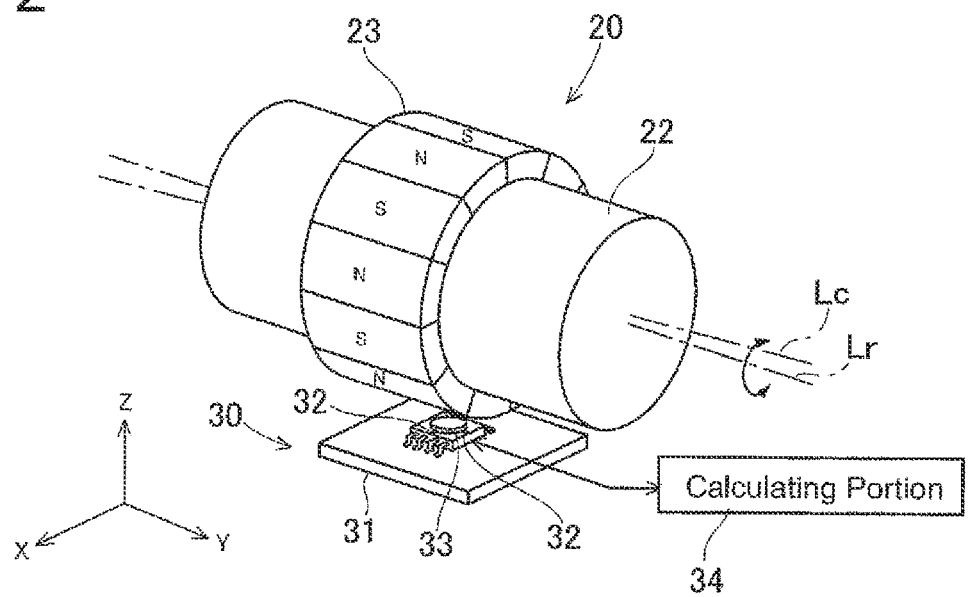
FIG. 2 is a perspective view of the angle detecting device, showing the main portion thereof.
Figure 3:
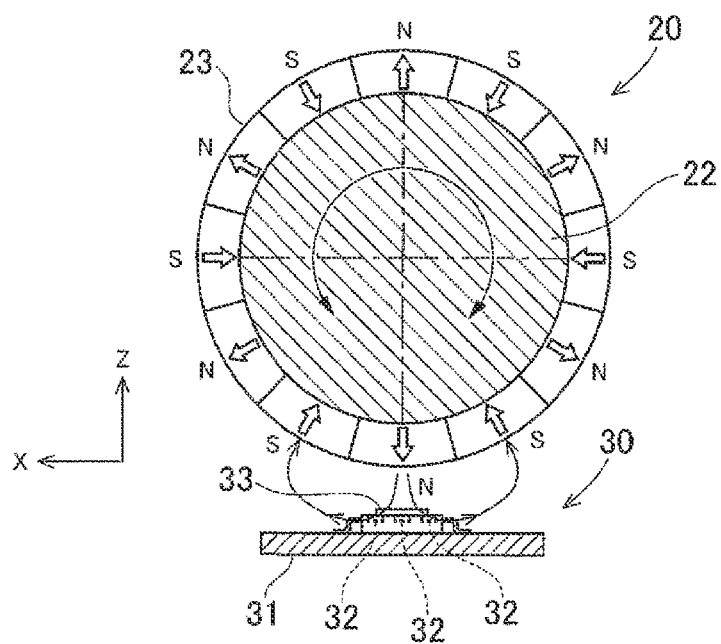
FIG. 3 is a cross sectional view of the angle detecting device, showing the main portion thereof in a direction perpendicular to the axis.

The magnet portion 23 is magnetized on the outer peripheral surface of the annular main body 21 with an equal interval in a circumferential (peripheral) direction. The magnet portion 23 is magnetized so that the N polarity and S polarity are arranged alternately and is formed of a cylindrical shape as a whole as shown in FIGS. 2 and 3. According to this embodiment the interval between the polarities is set to be 30 degree. The magnet portion 23 is magnetized so that the density of magnetic flux is distributed approximately sinusoidally over the outer surface of the main body 21 to generate a magnetic field in which the polarities are alternately arranged in the circumferential direction. According to this embodiment, individual magnets magnetized in advance are connected one another in the circumferential direction. However, the magnet portion 23 is structured as follows: First a plurality of magnetic materials are connected in a circumferential direction and then magnetized or magnetic material is formed in an integral cylindrical shape and each portion is magnetized to arrange the alternative polarities in a circumferential direction. The operation lever 24 is, for example, connected to an operation member such as a brake pedal. The rotation force in response to the operation is transmitted to the axial portion 22.

The angle calculating device 30 detects a plurality of magnetic field components of the magnetic field generated by the magnet portion 23 of the rotation member 20. The angle calculating device 30 then calculates the rotation angle of the rotation member 20 based on the detected plurality of magnetic field components in different directions. The angle calculating device 30 includes a base plate 31, a magnetic sensor 32, a magnetic plate 33 and a calculating portion 34. The base plate 31 is fixed to the base portion 11 of the case 10 so that the upper surface (surface closer to the bearing 12 of the case 10) is arranged perpendicular to the surface vertical to the central axis line Lc of the bearing 12. In other words, the upper surface of the base plate 31 faces the outer peripheral surface of the rotation member 20 formed by the magnet portion 23.

The magnetic sensor 32 is a sensor which detects the magnetic field and is formed by the Hall elements in this embodiment. The magnetic sensor 32 is arranged in a pair along the direction (X-direction) vertical to the central axis line Lc of the bearing 12 on the upper surface of the base plate 31 (X-Y plane). Further, the magnetic sensor 32 is arranged in a pair along the direction (Y-direction) parallel to the central axis line Lc of the bearing 12 on the upper surface of the base plate 31. The magnetic plate 33 is formed to be disc shaped and is arranged directly on the two sets of the magnetic sensors 32. Accordingly, the two sets of the magnetic sensors 32 can detect the magnetic field components of the magnetic field generated at circumference of the rotation member 20 and the magnetic plate 33.

Figure 4:
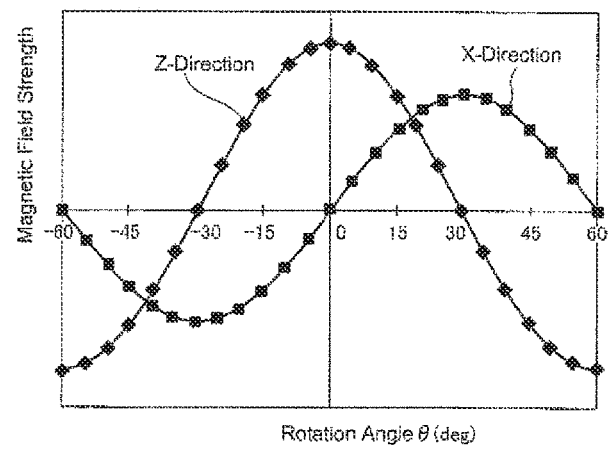
FIG. 4 is a graph showing the relationship between the rotation angle and the strength of the magnetic field of the rotation member.

The calculating portion 34 detects the magnetic field components in X-direction and Z-direction of the magnetic field based on signals outputted from the two sets of the magnetic sensors 32, respectively (Refer to FIG. 4). Then the calculating portion 34 calculates the magnetic field angle based on the ratio of the magnetic field components in X-direction and Z-direction. It is noted here that the calculating portion 34 memorizes in advance the linear relational expression (indicated with a solid line in FIG. 5) between the magnetic field angle $\alpha$ and the actual rotation angle $\theta$ of the rotation member 20. Thus, the calculating portion 34 calculates the rotation angle $\theta$ of the rotation member 20 based on the magnetic field angle $\alpha$ and the relational expression. Further, since the angle calculating portion 30 detects one magnetic field component in one direction, using a pair of magnetic sensors 32 to reduce adverse effects due to magnetic field disturbance from the difference in output voltage between the two magnetic sensors 32.

The torsion spring 40 is formed by an elastic material and is annularly shaped. The torsion spring is positioned at an outer peripheral side of the axial portion 22 to enclose the rotation member 20. The torsion spring 40 is arranged coaxial with the central axis line Lc of the bearing 12. The torsion spring has the first attaching portion 41 and the second attaching portion 42 at the axial ends thereof, respectively. Both first and second attaching portions are bent inwardly in an inner peripheral side from the winding portion and each tip end of the first and second attaching portions extends in an axial direction. The first attaching portion 41 is in contact with the case 10 and is engaged with the first spring fixing portion 13a formed on the side wall portion 13 of the case. Similarly, the second attaching portion 42 is in contact with the rotation member 20 and is engaged with the second spring fixing portion 21b formed on the flange portion 21a of the annular main body 21 of the rotation member 20.

Thus, the torsion spring 40 is fixed to the bearing 12 at the first attaching portion 41 through the side wall portion 13 to restrict the relative rotation with the bearing 12 and is fixed to the rotation member 20 at the second attaching portion 42 to restrict the relative rotation with the rotation member 20. The torsion spring 40 is wound around several times on the outer peripheral surface to have elasticity in circumferential direction and rotates the rotation member 20 so that the rotation member 20 returns to the initial stage of phase set relative to the bearing 12.

The torsion spring 40 is formed to have a certain pitch length between the wires wound around the outer periphery several times, which gives elasticity to the spring in an axial direction. When the angle detecting device 1 is assembled, the torsion spring 40 is disposed between the side wall portion 13 of the case 10 and the annular main body 21 of the rotation member 20 under a compressed condition in axial direction. Accordingly, the torsion spring 40 biases the rotation member 20 in a circumferential direction to return the rotation member 20 to the initial stage of phase thereof and at the same time biases the rotation member 20 in the central axis line direction Lc of the bearing 12 at a position (an engaging position between the second spring fixing portion 21b and the second attaching portion 42) apart from the rotation axis line Lr in a radial direction.

As explained above, the outer diameter of the axial portion 22 of the rotation member 20 is set to be smaller than the inner diameter of the bearing 12. Therefore, the rotation member 20 is more tiltable by an allowable maximum angle due to this dimensional difference. Further, the rotation member 20 is biased in a central axis line direction Lc of the bearing 12 at the second spring fixing portion 21b by the force of the torsion spring 40. Since the second spring fixing portion 21b is separated from the rotation axis line direction Lr in a radial direction, the rotation member 20 is inclined relative to the bearing 12. The direction of the inclination of the rotation member 20 is opposite to the direction where the second spring fixing portion 21b is formed. In other words, as shown in FIG. 1A, when the second spring fixing portion 21b is positioned at a position most separated from the angle calculating device 30, the magnet portion 23 inclines to a position most close to the angle calculating device 30.

(Operation/Function of Angle Detecting Device 1)

As explained above, according to the angle detecting device 1 thus structured, the rotation member 20 supported on the bearing 12 is rotated when the operation lever 24 is operated and the angle calculating device 30 detects the change of the magnetic field in response to this rotation thereby to calculate the rotation angle θ of the rotation member 20. In the angle detecting device 1 according to this embodiment, when the rotation member 20 assembled with the bearing 12 with a certain gap therewith rattles relative to the bearing 12 due to the gap therebetween, the magnetic field components of the magnetic field generated by the rotation member 20 fluctuate. The fluctuation of the magnetic field components is different depending on the direction of rattling of the rotation member 20. For example, when the rotation member 20 rattles and moves in a direction parallel to the X-direction, each magnetic field component as shown in FIG. 4 in each direction X and Z fluctuates and moves in a right/left direction. Then the magnetic field angle α calculated by the calculating portion 34 fluctuates and as the result, some errors occur in the rotation angle θ calculated from the relational expression shown in solid line in FIG. 5.

Further, the angle detecting device 1 may generate a difference caused by an accidental error between the magnetic field angle α calculated based on the detected each magnetic field component and the actual rotation angle of the rotation member 20 at the time when the detection signals are outputted due to the individual difference. Therefore, the angle detecting device 1 sets a corrected value so that the difference between the calculated angle α the actual rotation angle may be small as possible. The correction is made to have the relationship between the magnetic field angle α and the rotation angle θ become linear and the corrected linear relationship is memorized in the calculating portion 34. However, the difference caused by the rattling of the rotation member 20 is difficult to make a correction. This is because the moving direction and the inclination angle of the rotation member 20 vary depending on the vibrations and accelerations applied to the angle detecting device 1. Another means to solve the problem is to minimize the dimensional difference between the inner diameter of the bearing 12 and the outer diameter of the axial portion 22 of the rotation member 20. However, this solution may have some concerns that the manufacturing cost may increase or assemblability of the device may deteriorate.

Figure 6:
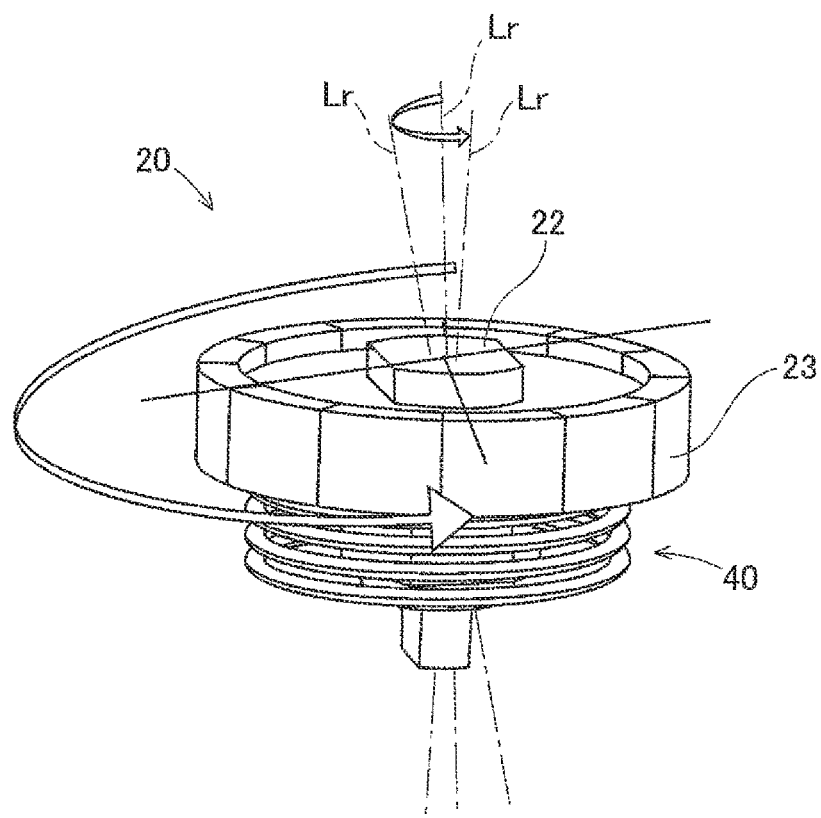
FIG. 6 is a perspective view of the rotation member and the torsion spring.

According to the embodiment of the angle detecting device 1 according to the invention, the rotation member 20 is biased by the torsion spring 40 in the central axis line Lc direction of the bearing 12 and the rotation member 20 is inclined with respect to the bearing 12. Further, the second attaching portion 42 of the torsion spring 40 is restricted from the relative rotation relative to the rotation member 20 which is engaged with the second spring fixing portion 21b. Accordingly, the torsion spring 40 is forced to be rotated with the rotation member 20. Thus, the torsion spring 40 biases the rotation member 20 keeping the phase difference between the rotation phase of the rotation of the rotation member 20 and the rotation phase of the rotation of the bearing 12 about the central axis line Lc with an inclined relationship with the rotation member 20, regardless of the rotation angle θ change of the rotation member 20. In other words, as shown in FIG. 6, the rotation member 20 rotates with oscillation movement in which the rotation member rotates by the rotation angle θ change in an inclined direction inclined by the torsion spring 40.

Figure 5:
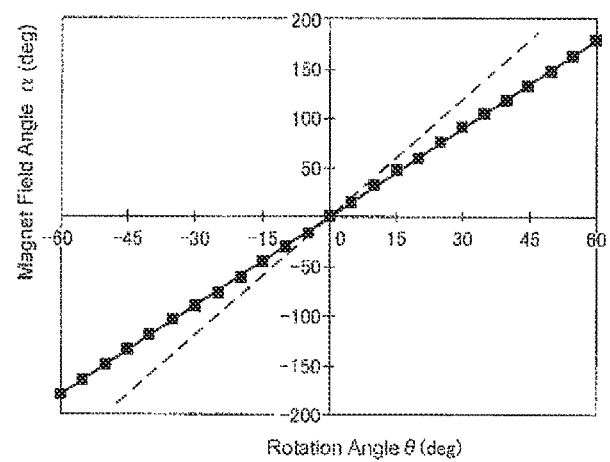
FIG. 5 is a graph showing the relationship between the rotation angle and the calculated value of the angle detecting device.
Figure 7:
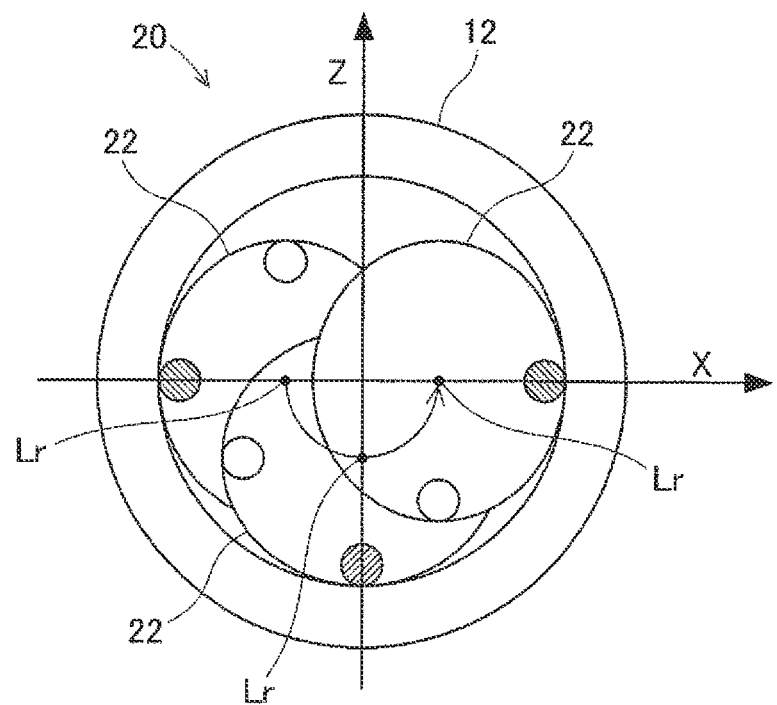
FIG. 7 is a conceptual view showing the function of torsion spring.

By this movement, as shown in FIG. 7, when the rotation member 20 rotates so that the rotation angle θ is changed, the rotation axis line Lr is rotated so that a particular portion of the axial portion 22 is always in contact with the inner peripheral surface of the bearing 12. Then, the rotation axis line Lr of the rotation member 20 moves along the same locus regardless of the change of rotation angle θ of the rotation member 20. In other words, when the rotation member 20 is rotated by a certain rotation angle θ, the movement direction and inclined angle of the rotation member 20 under the rotation member being rattled are constant. At this time, each magnetic field component shown in FIG. 4 is fluctuated to be shifted in right/left direction and vertical (up/down) direction. However, since the fluctuation amount is always constant relative to the rotation angle θ of the rotation member 20, the relationship between the magnetic field angle α calculated from each magnetic field component and the actual rotation angle θ is shown as indicated in FIG. 5 with a dotted line.

Thus, although the calculated magnetic field angle α is influenced by the gap between the bearing 12 and the rotation member 20, the fluctuation amount is repeatable and accordingly, the angle detecting device 1 sets a corrected value so that the difference between the calculated angle α the actual rotation angle may be small as possible. The correction is made to have the relationship between the magnetic field angle α and the rotation angle θ become linear and the corrected linear relationship is memorized in the calculating portion 34. The influence of the vibrations and accelerations applied to the angle detecting device 1 can be tolerable by setting the elastic force of the torsion spring 40 considering such influence.

(Effects Achieved by the Angle Detecting Device 1)

As explained, according to the angle detecting device 1, the rotation member 20 is rotated under being biased by the torsion spring 40, the position of the rotation member 20 relative to the bearing is always the same at each rotation angle. Therefore, even if a dimensional difference is set between the outer diameter of the rotation member 20 and the inner diameter of the bearing 12 and the rotation member 20 is assembled to the bearing 12 with a certain gap therebetween, the rotation member 20 is brought into contact with the inner peripheral surface of the bearing 12 by the biasing force of torsion spring 40 and is rotatable without generating any rattling.

Further, the inclination angle and inclination direction of the rotation member 20 keep a constant relationship relative to each rotation angle θ and accordingly, the fluctuation amount of the magnetic field component is kept constant. The angle detecting device 1 corrects the calculated magnetic field angle α by the angle calculating device 30 considering the constant fluctuation amount of the magnetic field component to more accurately detect the rotation angle θ of the rotation member 20 compared to the conventional devices.

Further, since the torsion spring 40 biases the rotation member 20 at a position apart from the rotation axis line Lr in a radial direction towards the central axis line Lc of the bearing 12, the rotation member 20 can be surely inclined relative to the central axis line Lc of the bearing 12. This can keep the fluctuation amount of the magnetic field components to be constant. In addition, since the torsion spring 40 is arranged coaxial to the bearing 12 by enclosing at least a portion of the rotation member 20, the rotation member 20 is more stably biased in the central axis line Lc direction of the bearing 12.

Further, the angle detecting device 1 is provided with the torsion spring 40 which is an elastic member used as a return spring for returning the rotation member 20 to the initial stage of phase set relative to the bearing 12. Since the torsion spring 40 is provided with a predetermined pitch between the wires wound several times, the torsion spring 40 has elasticity in an axial direction. The angle detecting device 1 utilizes this elasticity in the axial direction for biasing the rotation member 20 in an axial direction. Accordingly, the torsion spring 40 which is also used as a return spring is commonly used as an elastic member for biasing the rotation member 20 in an axial direction. Thus, the angle detecting device 1 can keep the fluctuation amount of the magnetic field components of the magnetic field generated by the magnet portion 23 of the rotation member 20 to be a constant amount, without increasing the number of parts. Accordingly, the angle detecting device 1 can improve the detecting accuracy of detecting rotation angle θ of the rotation member 20.

Modified First Embodiment

According to the first embodiment, the torsion spring 40 has elasticity in an axial direction due to the provision of the predetermined pitch (distance) between the wound wires of the spring. Upon assembling the torsion spring 40 to the angle detecting device 1, the torsion spring 40 is disposed between the side wall portion 13 and the annular main body 21 giving a pre-loaded compression in an axial direction. On the contrary, as a modification to the first embodiment, hooks may be provided at the first and the second attaching portions 41 and 42 of the torsion spring 40 and upon assembling of the angle detecting device 1, the torsion spring 40 disposed between the side wall portion 13 of the case 10 and the annular main body 21 of the rotation member 20 under an expanded condition in an axial direction. According to the modified embodiment, the pitch between the wires is not necessarily provided and instead, the adjacent wires are arranged in closely contact with one another to form a pitchless wiring profile.

According to thus structured device, the inclination direction of the rotation member 20 is the direction in which the second spring fixing portion 21b is positioned. As shown in FIG. 1A, when the second spring fixing portion 21b is located at a position separated farthest from the position of the angle calculating device 30, the magnet portion 23 of the rotation member 20 inclines so that the magnet portion is positioned separated farthest from the position of the angle calculating device 30. According to this modified embodiment, although the inclination direction is opposite to the direction explained in the previous embodiment, the same effects will be obtained.

Second Embodiment

The angle detecting device 101 according to the second embodiment will be explained with reference to the attached drawings. It is noted here that the angle detecting device 101 of this embodiment uses a spring washer as the elastic member instead of using torsion spring 40 as the elastic member in the angle detecting device 1 according to the previous embodiment. The remaining structures are substantially the same as those in the previous embodiment and accordingly, the detail explanation thereof will be omitted and the structures different from those of the previous embodiment will be explained hereinafter.

(Structure of Angle Detecting Device 101)

As shown in FIG. 8A, the angle detecting device 101 includes the angle calculating device 30 and a spring washer 140. The angle detecting device 101 detects the magnetic field components which changes in accordance with the rotation of the rotation member 120 by the angle calculating device 30 and calculates the rotation angle of the rotation member 120 relative to the case 10. The rotation member 120 rotates relative to the case 10 and is formed by the annular main body 21, the axial portion 22, the magnet portion 23 and the operation lever 124. The operation lever 124 is formed in an L-shape and is inserted into and connected to an outer peripheral surface of the axial portion 22 at one end (lower end as viewed in FIG. 8A). The operation lever 124 is provided with a spring washer engaging groove 124a in a radial direction at a peripheral connecting portion with the axial portion 22 facing to an opposing surface of the side wall portion 13 of the case 10. The spring washer engaging groove 124a is engaged with a later described projecting portion 141 of the spring washer 140.

The spring washer 140 is an elastic member formed to be generally annularly shaped as shown in FIG. 8B. The spring washer 140 is inserted into the axial portion 22 of the rotation member 120 so that the spring washer 140 is positioned between the one end (lower end as viewed in FIG. 8A) of the bearing 12 and the operation lever 124. Further, the spring washer 140 is provided with the projecting portion 141 projecting outwardly in a radial direction. The projecting portion 141 is positioned at the outer peripheral portion opposite to a slit relative to the center of the washer. The projecting portion 141 is to be engaged with the spring washer engaging groove 124a. Accordingly, the rotation of the spring washer 140 relative to the rotation member 120 is restricted at a portion of the outer peripheral portion thereof. Thus, the spring washer 140 starts to rotate in accordance with the rotation of the rotation member 120 and is rotated relative to the bearing 12.

Further, the spring washer 140 generates elasticity in an axial direction when the both ends which form the slit are twisted. Upon assembling the angle detecting device 101, the spring washer 140 is disposed between the side wall portion 13 of the case 10 and the operation lever 124 of the rotation member 120 under an axially compressed state. In other words, the spring washer 140 biases the rotation member 120 in the central axis line Lc direction of the bearing 12. Under the assembled condition, the one end side of the spring washer 140 is in contact with an end surface of the bearing 12 and the other end side is in contact with the operation lever 124. The contact position between the other end side of the spring washer 140 and the operation lever 124 is located off the rotation axis line Lr of the rotation member 120 in a radial direction.

It is noted here that the outer diameter of the axial portion 22 of the rotation member 120 is set to be smaller than the inner diameter of the bearing 12. Accordingly, the rotation member 120 is tiltable by a maximum allowable angle defined by such dimensional difference. The rotation member 120 is inclined relative to the bearing 12 by the biasing force of the spring washer 140. The inclining direction of the rotation member 120 is the opposite direction in which the spring washer engaging groove 124a is formed. In other words, as shown in FIG. 8A, when the spring washer engaging groove 124a is positioned at a position most separated from the angle calculating device 30, the magnet portion 23 of the rotation member 120 inclines to a position most close to the angle calculating device 30. Further, in the angle detecting device 101 according to the embodiment, if the rotation member 120 is necessary to be returned to the initial stage of phase relative to the bearing 12, the structure may be modified to include for example, a torsion spring.

(Operation of Angle detecting Device 101)

According to thus structured angle detecting device 101, when the operation lever 124 is operated, the rotation member 120 supported on the bearing 12 is rotated and then the angle calculating device 30 detects the change of the magnetic field in accordance with the rotation of the rotation member 120 and calculates the rotation angle θ of the rotation member 120. In this angle detecting device 101, when the rotation member assembled with a certain gap with the bearing 12 rattles due to such gap relative to the bearing 12, the magnetic field components of the magnetic field generated by the rotation member 120 fluctuate. It is difficult to correct an accidental error caused by such rattling. This is because the moving direction and the inclination angle of the rotation member 120 vary depending on the vibrations and accelerations applied to the angle detecting device 101.

Accordingly, to solve such difficulty, in the angle detecting device 101 according to this invention, the rotation member 120 is biased by the spring washer 140 in the central axis line Lc direction of the bearing 12 to incline the rotation member 120 relative to the bearing 12. The rotation of the spring washer 140 relative to the rotation member 120 is restricted by the engagement of the projecting portion 141 of the spring washer 140 with the spring washer engaging groove 124a and accordingly, the spring washer 140 initiates rotation with the rotation member 120. Accordingly, the spring washer 140 biases the rotation member 120 so that the phase difference between a rotation phase of the rotation member 120 and a rotation phase of the bearing 12 rotating about the central axis line Lc thereof with an inclined angle relative to the rotation member 120 is kept constant regardless of the change of the rotation angle θ of the rotation member 120. As similar to the rotation member 20 of the angle detecting device 1 according to the previous embodiment, the rotation member 120 rotates with an oscillating movement oscillating in an inclined direction by an angle change of the rotation angle θ. The method for calculation and the correction of the magnetic field angle α are substantially the same with those in the first embodiment and the explanation thereof is omitted here.

(Effects of Angle Detecting Device 101)

Substantially the same or similar effects of the angle detecting device 1 according to the previous embodiment are achieved by the angle detecting device 101 of this embodiment. According to the angle detecting device 101, the rotation member 120 is rotated under being biased by the spring washer 140, the position of the rotation member 120 relative to the bearing 12 is always the same at each rotation angle. Therefore, even if a dimensional difference is set between the outer diameter of the rotation member 120 and the inner diameter of the bearing 12 and the rotation member 120 is assembled to the bearing 12 with a certain gap therebetween, the rotation member 120 is brought into contact with the inner peripheral surface of the bearing 12 by the biasing force of spring washer 140 and is rotatable without generating any rattling.

Further, the inclination angle and inclination direction of the rotation member 120 keep a constant relationship relative to each rotation angle θ and accordingly, the fluctuation amount of the magnetic field component is kept constant. The angle detecting device 101 corrects the calculated magnetic field angle α by the angle calculating device 30 considering the constant fluctuation amount of the magnetic field component to more accurately detect the rotation angle θ of the rotation member 120 compared to the conventional devices.

Further, the angle detecting device 101 uses the spring washer 140 as the elastic member. This spring washer 140 generates elasticity in an axial direction by twisting both end sides of the slit formed at the outer periphery thereof. The angle detecting device 101 utilizes this elasticity in axial direction and biases the rotation member 120 in an axial direction. Thus the fluctuation amount of the magnetic field component is kept constant and the accuracy of detecting the rotation angle θ of the rotation member 120 can be improved according to the angle detecting device 101. Further, by using the spring washer 140 as the elastic member, the rotation member 120 can be effectively inclined even under a space limited condition.

Modified Embodiment to the Second Embodiment

According to the structure of the embodiment, the spring washer 140 is provided with the projecting portion 141 formed at the outer peripheral portion and projecting outwardly in a radial direction and the projecting portion 141 of the spring washer 140 is engaged with the spring washer engaging groove 124a of the rotation member 120. However, the spring washer 140 may be provided with a recessed portion 142 formed at the outer peripheral portion and recessed inwardly in a radial direction as shown in FIG. 8C. In this modification, the operation lever 124 is provided with a protrusion in a radial direction which engages with the recessed portion 142 of the spring washer 140 at a peripheral connecting portion with the axial portion 22 facing to an opposing surface of the side wall portion 13 of the case 10. The rotation of the spring washer 140 relative to the rotation member 120 is restricted and is rotated in accordance with the rotation of the rotation member 120. According to this modification, the same or similar effects can be achieved with those in the previous embodiment.

Others

The embodiments of the invention have been hitherto explained with the structures of the angle detecting devices 1 and 101. Further, the torsion spring 40 of the first embodiment and the spring washer 140 of the second embodiment are used as the elastic member and the relative rotations of the torsion spring 40 and the spring washer 140 relative to the rotation members 20 and 120 are restricted respectively and rotated in accordance with the rotations of the rotation members 20 and 120. However, this can be modified such that one end of the elastic member is allowed to be rotated relative to the rotation of the rotation member 20 and 120 but the rotation of the other end of the elastic member relative to the case 10 having the bearing 12 is prohibited. Under such condition, the elastic member biases the rotation member 20 and 120 in a central axis line Lc direction of the bearing 12.

In more detail, according to the angle detecting device 1 of the first embodiment, the rotation member 20 and the torsion spring 40 are in contact with each other without engagement between the flange portion 21a of the annular main body 21 of the rotation member 20 and the second attaching portion 42 of the torsion spring 40. Then, the one end of the torsion spring 40 biases the rotation member with slidable movement relative to the rotation movement of the rotation member 20. Thus, the position of the rotation member 20 which is biased by the torsion spring 40 changes in accordance with the change of the rotation angle of the rotation member 20. This can keep the inclination direction of the rotation member 20 to be constant at any rotation angle position.

Further, according to the angle detecting device 101 of the second embodiment, the spring washer engaging groove 124a or the protrusion provided on the rotation member 120, which are to be engaged with the projecting portion 141 of the spring washer 140 or the recessed portion 142 thereof may be for example provided on the end surface of the bearing 12 or the side wall portion 13 of the case 10. In this modification, the spring washer 140 moves slidably relative to the rotation of the rotation member 120 by biasing the rotation member 120 at the one end of the spring washer 140. This can keep the inclination direction of the rotation member 120 to be constant at any rotation angle position. Accordingly, in the angle detecting devices 1 and 101 of the first and the second embodiments, the inclination direction of the rotation member 20 and 120 can be kept constant at any rotation angle situation of the rotation member and accordingly, the fluctuation amount of the magnetic field components can be kept constant. The angle detecting devices 1 and 101 can detect the rotation angle θ of the rotation members 20 and 120 with an improved accuracy.

Further, the torsion spring 40 and the spring washer 140 as the elastic member of the first and the second embodiments bias the rotation members 20 and 120 in the central axis line Lc direction of the bearing 12. However, the elastic member may be formed such that the elastic member biases the rotation members 20 and 120 in a radial direction of the bearing 12 at a position apart from one end side of the bearing 12 towards one side of the central axis line Lc direction. In other words, the elastic member biases the rotation member at a position of the axial portion 22 of the rotation members 20 and 120 apart from the end portion of the bearing 12. The one end side of the bearing 12 is either the side of the bearing 12 closer to the annular main body 21 of the rotation member 20 (upper side end as viewed in FIGS. 1A and 8a) or the opposite end side thereto.

According to this structure, the rotation member 20 can be surely inclined relative to the central axis line Lc of the bearing 12. Thus, the fluctuation amount of the magnetic field components can be kept constant. Further, it can be formed that the rotation of the elastic member relative to at least one of the bearing 12 and the rotation members 20 and 120 can be restricted. Thus, the rotation members 20 and 120 can be rotated keeping the inclined direction when the elastic member is engaged with the case 10 which includes the bearing 12 and rotates the rotation axis line Lr of the rotation member 20 and 120 being in oscillating movement when the elastic member is engaged with the rotation members 20 and 120. In any situation above, since the inclination directions of the rotation members 20 and 120 are always constant at any rotation angle of the rotation members, the fluctuation amount of the magnetic field components can be kept constant. This can improve the detection accuracy of rotation angle θ of the rotation members 20 and 120 of the angle detecting device 1 and 101.

Further, the angle calculating device 30 which corresponds to the angle calculating means explained in the first and the second embodiments detects the magnetic field components in X-direction and Z-direction as the different plurality of detecting directions. However, the plurality of different directions to be detected can be set to the X-direction and Y-direction in the first embodiment. In this case, the vertical direction of the base plate 31 of the angle calculating device 30 may be arranged to be in parallel with the central axis line Lc of the bearing 12. Thus, the invention is not limited to the disclosed embodiments but any modifications or alterations can be included in the scope of the invention as long as the structure in which the magnetic field generated by the rotation member supported by the bearing changes in accordance with the rotation angle θ and the rotation angle θ can be calculated based on the magnetic field components of the magnetic field. According to such structure within the scope of the invention, the same or similar effects of the previous embodiments of the invention can be also achieved thereby.

The angle detecting device associated with the embodiments of the invention as described above, angle detecting device 1, 101 comprises a rotation member 20, 120 provided with a magnet portion 23 which generates a magnetic field having polarities N and S arranged alternately in a circumferential direction, a case 10 having a bearing 12 on which the rotation member 20, 120 is rotatably supported, an angle calculating device 30 for detecting magnetic field components of the magnetic field in a plurality of different directions X-, Y- and Z-directions and calculating a rotation angle θ of the rotation member based on the detected magnetic field components and a torsion spring 40 or a spring washer 140 as an elastic member which biases the rotation member 20, 120 so that the rotation member is rotated, keeping a constant inclined direction relative to a central axis line Lc of the bearing 12 or which biases the rotation member 20, 120 so that a phase difference between a rotation phase of the rotation member and a rotation phase of the bearing rotating about the central axis line thereof with the inclined direction relative to the rotation member is kept constant regardless of a change of the rotation angle θ of the rotation member.

According to the angle detecting device associated with the embodiments of the invention, since the rotation member 20, 120 rotates under a state being biased by the torsion spring 40 or the spring washer 140, the position of the rotation member at every angle relative to the position of the bearing 12 becomes constant. Accordingly, the rotation member is always in contact with the inner peripheral surface of the bearing 12 by the biasing force of the torsion spring 40 or the spring washer 140 without causing a rattling therebetween even in a case where a dimensional tolerance is provided between the outer diameter of the rotation member 20, 120 and the inner diameter of the bearing 12 and the rotation member is assembled with a certain gap with the bearing reflecting such dimensional tolerance. Under the structure of the angle detecting device according to the embodiments described above, the rotation axis line Lr of the rotation member 20, 120 is inclined with an angle relative to the central axis line Lc and accordingly, the magnetic field components of the magnetic field generated by the magnet portion 23 of the rotation member is fluctuated from the magnetic field components under the state that the both axis lines Lc and Lr agreed. However, since the inclined angle and the inclined direction of the rotation member are in constant relation with each rotation angle θ of the rotation member 20, 120, the fluctuation amount of the magnetic field components becomes constant. Thus, due to the fact that the fluctuation amount of the magnetic field components is constant, the angle detecting device 1, 101 can perform a highly accurate detection by correcting the detection value compared to the conventional devices.

Further, the torsion spring 40 or the spring washer 140 used as the elastic member biases the rotation member 20, 120 so that the rotation member rotates keeping a fixed inclined direction relative to the central axis line Lc of the bearing 12. In other words, the inclined direction (angle) of the rotation member is not fluctuated from the initial state in any angle situation. Therefore, the fluctuation amount of the magnetic field components of the magnetic field generated by the magnet portion 23 of the rotation member can be set to be a constant value. Alternately, the torsion spring 40 or the spring washer 140 biases the rotation member so that the phase difference between the rotation phase of the rotation member and the rotation phase of the bearing rotating about the central axis line thereof with an inclined direction relative to the rotation member is kept constant regardless of the change of the rotation angle of the rotation member. In other words, the rotation member rotates along the inner peripheral surface of the bearing by the rotated angle and the inclination angle (direction) relative to the bearing is fluctuated. Thus, the rotation member rotates with the rotation axis line Lr thereof being oscillated relative to the central axis line Lc of the bearing 12. Under such rotation movement, the contact position between the inner peripheral surface of the bearing 12 and the outer peripheral surface of the rotation member 20, 120 is always constant in any angular situation. Accordingly, the fluctuation amount of the magnetic field components of the magnetic field generated by the magnet portion of the rotation member 20, 120 can be kept to a fixed amount. Thus, the angle detecting device 1, 101 according to the embodiments of the invention can detect the rotation angle θ of the rotation member with highly accuracy.

(2) Further, in the angle detecting device 1 according to the embodiments of the invention, the torsion spring 40 is in contact with the rotation member 20 at the first attaching portion 41 and in contact with the case 10 at the second attaching portion 42. The torsion spring 40 biases the rotation member 20 in the central axis line Lc direction of the bearing 12 at a position apart from the rotation axis line Lr of the rotation member 20 in a radial direction under the relative rotation relative to the rotation member 20 or the case 10 being in contact with at least one of the first and the second attaching portion 41 or 42 of the torsion spring 40.

According to this second aspect of the embodiment described above, the rotation member 20 can be surely inclined relative to the central axis line Lc of the bearing 12 by the biasing force of the torsion spring 40 biasing the rotation member in a central axis line Lc direction of the bearing 12 at the position apart from the rotation axis line Lr of the rotation member 20 in a radial direction. According to this structure, the fluctuation amount of the magnetic field components of the magnetic field can be kept to be a constant value. Further, at least one of the first and the second attaching portion 41 or 42 of the torsion spring 40, which is in contact with the rotation member 20 or the case 10 is restricted from the rotation relative to the rotation member or the case. It is presumed here that the relative rotation between the one end (first attaching portion 41) of the torsion spring 40 and the rotation member 20 which is in contact with the first attaching portion 41 of the torsion spring 40 is allowed and that the relative rotation between the other end (second attaching portion 42) of the torsion spring 40 and the case 10 which is in contact with the second attaching portion 42 of the torsion spring 40 is restricted. Under such presumed condition, when the torsion spring 40 biases the rotation member 20, the first attaching portion 41 of the torsion spring 40 biases the rotation member 20 in contact therewith and slidably moves together with the rotation member 20. This will change the position of the rotation member 20 biased by the torsion spring 40 in accordance with the change of the rotation angle. Thus, the inclined direction in any rotation angle situation is the same and the fluctuation amount of the electric field components can be kept to a fixed value.

Further, it is presumed here that the torsion spring 40 biases the rotation member 20 under the relative rotation between the first attaching portion 41 of the torsion spring 40 which is in contact with the rotation member 20 and the rotation member 20 being restricted. Then, the first attaching portion 41 of the torsion spring 40 is rotated together with the rotation member 20 which is in contact with the first attaching portion 41 of the torsion spring 40. Accordingly, the position of the rotation member 20 biased by the torsion spring 40 is always the same in spite of the change of the rotation angle θ of the rotation member 20. The rotation member 20, therefore, rotates with the rotation axis line Lr being in oscillation movement. Thus, the contact position of the rotation member 20 with the case 10 having the bearing 12 is always the same (fixed). Thus, according to the angle detecting device 1 of this aspect, the fluctuation amount of the magnetic field components can be kept constant thereby to highly accurately detect the rotation angle θ of the rotation member 20.

(3) Further, in the angle detecting device 1, 101 associated with a third aspect of the embodiment, the torsion spring 40 or the spring washer 140 as the elastic member is in contact with the rotation member at one end and in contact with the case at the other end and the elastic member biases the rotation member 20, 120 in a radial direction of the bearing 12 at a position apart from one side in the central axis line Lc direction of the bearing 12 under a restriction of a rotation relative to the rotation member 20, 120 or the case 10 being in contact with one of the both ends of the torsion spring 40 or the spring washer 140.

According to the third aspect of the embodiment described above, the rotation member 20, 120 can be surely inclined relative to the central axis line Lc of the bearing 12 by the biasing force of the torsion spring 40 or the spring washer 140 biasing the rotation member 20, 120 in a radial direction of the bearing at the position apart from the one end side of the bearing to one side in the central axis line Lc direction. According to this structure, the fluctuation amount of the magnetic field components of the magnetic field can be kept to be a constant value. Further, at least one of the first and the second attaching portions 41, 42 of the torsion spring 40 which is in contact with the rotation member 20 or the case 10 is restricted from the rotation relative to the rotation of the rotation member or the case. It is presumed here that the relative rotation between the one end of the torsion spring 40 and the rotation member 20 which is in contact with the one end 41 of the torsion spring 40 is allowed and that the relative rotation between the other end 42 of the torsion spring 40 and the case 10 which is in contact with the other end 42 of the torsion spring is restricted. Under such presumed condition, when the torsion spring 40 biases the rotation member 20, the one end 41 of the torsion spring 40 biases the rotation member 20 in contact therewith and slidably moves together with the rotation member. This will change the position of the rotation member biased by the torsion spring 40 in response to the change of the rotation angle θ. Thus, the inclined direction in any rotation angle is the same and the fluctuation amount of the electric field components can be kept to a fixed value.

Further, it is presumed here that the torsion spring 40 biases the rotation member 20 under the relative rotation between the one end 41 of the torsion spring 40 which is in contact with the rotation member 20 and the rotation member 20 being restricted. Then, the one end 41 of torsion spring 40 is rotated together with the rotation member 20 which is in contact with the one end 41 of torsion spring 40. Accordingly, the position of the rotation member biased by the torsion spring 40 is always the same in spite of the change of the rotation angle θ of the rotation member 20. The rotation member, therefore, rotates with the rotation axis line Lr being in oscillation movement. Thus, the contact position of the rotation member 20 with the case 10 having the bearing 12 is always the same (fixed). Thus, according to the angle detecting device 1 of this aspect, the fluctuation amount of the magnetic field components can be kept constant thereby to highly accurately detect the rotation angle θ of the rotation member.

(4) Further, the angle detecting device 1, 101 associated with a fourth aspect of the embodiment is characterized in that the torsion spring 40 is formed annularly and is arranged coaxial with the bearing 12 so that the rotation member 20, 22 is enclosed thereby.

According to the fourth aspect of the embodiment described above, since the torsion spring 40 is formed annularly and arranged coaxial with the bearing 12 so that at least a portion 22 of the rotation member is enclosed thereby, the rotation member 12, 22 can be biased more stably in a central axis direction of the bearing 12. The elastic member 140 is for example, formed annularly over the entire configuration and is provided with elasticity in an axial direction. The elastic member 140 is assembled together with the bearing 12 and the rotation member 20, 120 with pre-loaded for biasing in a central axis direction of the bearing 12. Therefore, the rotation member 20, 120 is arranged with an inclination relative to the central axis line Lc of the bearing 12. The rotation member 20, 120 is biased by the elastic member so that the rotation member can be rotated, keeping an inclined relation with the bearing or rotated with oscillating movement. Thus the fluctuation of the magnetic field components can be kept constant and the detecting accuracy of the rotation member 20, 120 of the angle detecting device 1, 101 can be improved.

(5) Further, the angle detecting device associated with a fifth aspect of the embodiment is characterized in that in addition to the feature of the fourth aspect, the elastic member is formed by a torsion spring one end 41 of which is fixed to the rotation member 20 and the other end 42 of which is fixed to the case 10 thereby to rotate the rotation member 20, 120 to be returned to a predetermined initial stage of phase relative to the bearing 12.

According to the fifth aspect of the embodiment described above, since the elastic member is formed by the annular shaped torsion spring and one end 41 of which is fixed to the rotation member 20 and the other end 42 of which is fixed to the case 10 on which the bearing 12 is attached. Accordingly, the elastic member 40, 140 can bias the rotation member so that the rotation member can rotate with oscillating movement. The torsion spring 40 is an elastic member having elasticity in a circumferential direction and is used as a return spring for returning the rotation member 20, 120 to the predetermined initial stage of phase relative to the bearing. The torsion spring 40 accumulates the biasing force in a circumferential direction according to the rotation of the rotation member 20, 120 by an application of external force and after the application of the external force stops, the rotation member 20, 120 is returned to the initial stage phase by the accumulated force. The torsion spring 40 is wound up in a plurality of times having the same diameter in each winding to have an elasticity in an axial direction. The present invention utilizes such axial elasticity of the torsion spring 40 for biasing the rotation member 20, 120 in an axial direction. Accordingly, the torsion spring 40 for returning the rotation member 20, 120 is commonly used with the elastic member for biasing the rotation member in an axial direction. This can fix the fluctuation amount of the magnetic field components of the magnetic field generated by the magnet portion 23 of the rotation member 20, 120 without increasing the number of parts.

(6) Still further, the angle detecting device 1, 101 associated with a sixth aspect of the embodiment is characterized in that the magnet portion 23 is formed by a plurality of magnets 23 so that the polarities N, S are alternately arranged in a circumferential direction.

According to the sixth aspect of the embodiment described above, the magnet portion 23 of the rotation member 20 is formed by a plurality of individual magnets 23 magnetized in advance and the plurality of individual magnets is connected in a circumferential direction or formed by a plurality of magnetic materials and the plurality of magnetic materials is magnetized after being connected in a circumferential direction. The angle detecting device 1, 101 structured with the magnet portion 23 thus arranged can also successfully achieve the effects of the embodiment of the invention.

The invention claimed is:
1. An angle detecting device comprising:
a rotation member provided with a magnet portion which generates a magnetic field having polarities arranged alternately in a circumferential direction;
a case having a bearing on which the rotation member is rotatably supported;
an angle calculating means for detecting magnetic field components of the magnetic field in a plurality of different directions and calculating a rotation angle of the rotation member based on the detected magnetic field components; and
an elastic member which biases the rotation member so that the rotation member is rotated, keeping a constant inclined direction relative to a central axis line of the bearing or biases the rotation member so that a phase difference between a rotation phase of the rotation member and a rotation phase of the bearing rotating about the central axis line thereof with the inclined direction relative to the rotation member is kept constant regardless of a change of the rotation angle of the rotation member, wherein the angle calculating means comprises a first pair of magnetic sensors arranged in a line perpendicular to the central axis line and a second pair of magnetic sensors arranged in a line parallel to the central axis line.

2. The angle detecting device according to claim 1, wherein,
the elastic member is in contact with the rotation member at one end and in contact with the case at the other end and wherein
the elastic member biases the rotation member in the central axis line direction of the bearing at a position apart from the rotation axis line of the rotation member in a radial direction under the relative rotation relative to the rotation member or the case being in contact with at least one of the one end or the other end of the elastic member.

3. The angle detecting device according to claim 1, wherein
the elastic member is in contact with the rotation member at one end and in contact with the case at the other end and wherein
the elastic member biases the rotation member in a radial direction of the bearing at a position apart from one side in the central axis line direction of the bearing under a restriction of a relative rotation relative to the rotation member or the case being in contact with one of the both ends of the elastic member.

4. The angle detecting device according to claim 2, wherein
the elastic member is formed annularly and is arranged coaxial with the bearing so that the rotation member is enclosed thereby.

5. The angle detecting device according to claim 4, wherein,
the elastic member is formed by a torsion spring one end of which is fixed to the rotation member and the other end of which is fixed to the case thereby to rotate the rotation member to be returned to a predetermined initial stage of phase relative to the bearing.

6. The angle detecting device according to claim 1, wherein,
the magnet portion is formed by a plurality of magnets so that the polarities are alternately arranged in a circumferential direction.

7. The angle detecting device according to claim 1, wherein the angle calculating means calculates a magnetic field angle of the magnetic field and applies a predetermined linear relationship between magnetic field angle and rotation angle to the calculated magnetic field angle to calculate the rotation angle.

8. The angle detecting device according to claim 7, wherein
the elastic member is in contact with the rotation member at one end and in contact with the case at the other end and wherein
the elastic member biases the rotation member in the central axis line direction of the bearing at a position apart from the rotation axis line of the rotation member in a radial direction under the relative rotation relative to the rotation member or the case being in contact with at least one of the one end or the other end of the elastic member.

9. The angle detecting device according to claim 7, wherein
the elastic member is in contact with the rotation member at one end and in contact with the case at the other end and wherein
the elastic member biases the rotation member in a radial direction of the bearing at a position apart from one side in the central axis line direction of the bearing under a restriction of a relative rotation relative to the rotation member or the case being in contact with one of the both ends of the elastic member.

10. The angle detecting device according to claim 8, wherein
the elastic member is formed annularly and is arranged coaxial with the bearing so that the rotation member is enclosed thereby.

11. The angle detecting device according to claim 10, wherein,
the elastic member is formed by a torsion spring one end of which is fixed to the rotation member and the other end of which is fixed to the case thereby to rotate the rotation member to be returned to a predetermined initial stage of phase relative to the bearing.

12. The angle detecting device according to claim 7, wherein,
the magnet portion is formed by a plurality of magnets so that the polarities are alternately arranged in a circumferential direction.

* * * * *